Oct. 4, 1949.  E. STANKO  2,483,790
RADIO BEACON
Filed Nov. 27, 1945

INVENTOR.
Edward Stanko
BY
ATTORNEY

Patented Oct. 4, 1949

2,483,790

UNITED STATES PATENT OFFICE 2,483,790

RADIO BEACON

Edward Stanko, Haddon Heights, N. J., assignor to Radio Corporation of America, a corporation of Delaware Application November 27, 1945, Serial No. 631,166

4 Claims. (Cl. 343—101)

1

This invention relates to radio beacon systems, and its principal object is to provide a method of and means for determining and indicating the direction of motion of a receiver station with respect to a transmitter station. Thus in landing or approach beacon systems, it is necessary to know whether the beacon is being approached from the east or from the west, for example. In radio collision prevention systems, it is desirable to differentiate between craft heading in the same direction and craft heading in opposite directions. The present invention enables determination of such information without reliance upon gradual change of signal strength, or upon auxiliary equipment at stations other than the two being considered.

Figure 1:
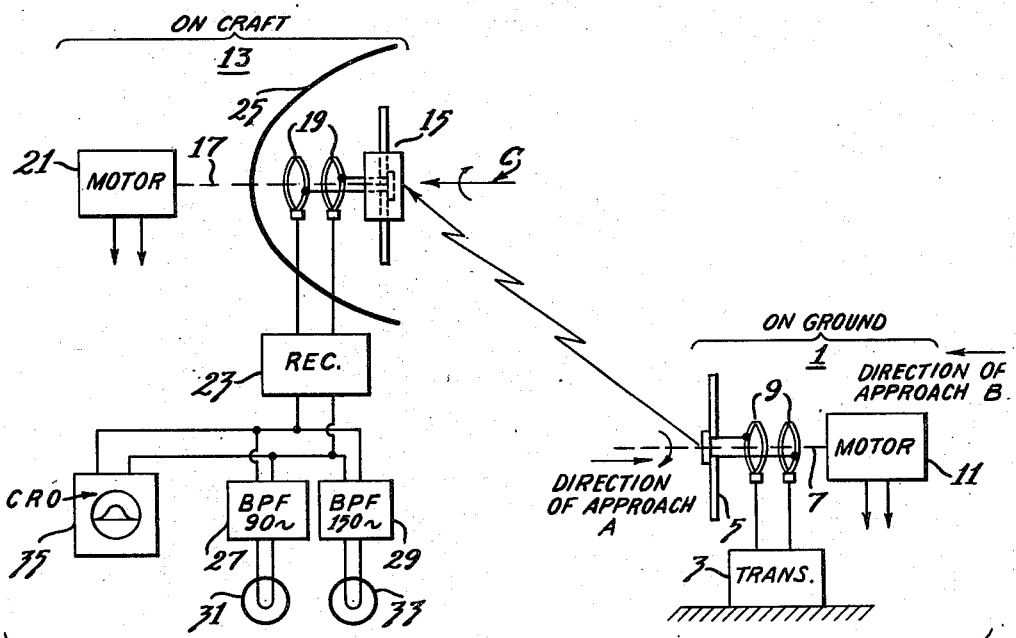
Figure 2:
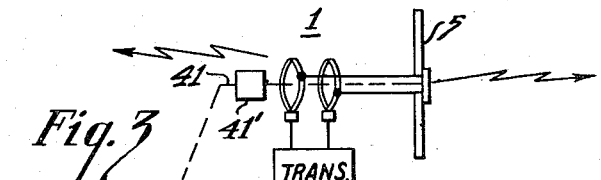
Figure 3:
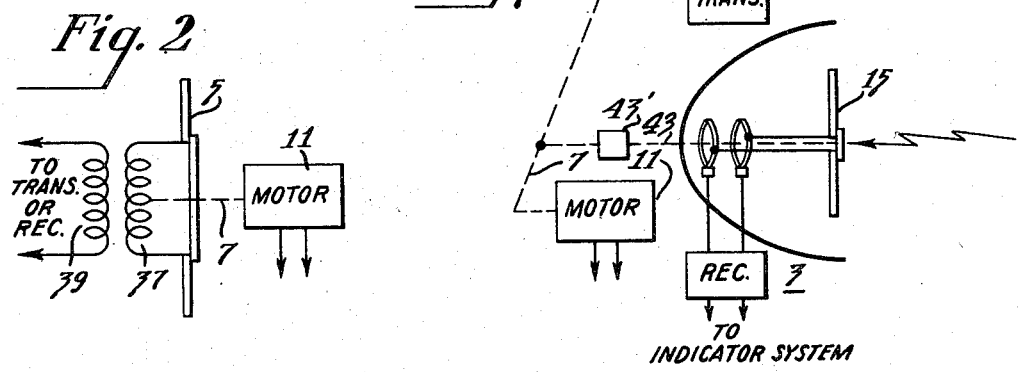

The invention will be described with reference to the accompanying drawing, wherein Figure 1 is a schematic diagram of one embodiment of the invention as applied to a radio approach or landing beacon system for aircraft, Figure 2 illustrates schematically a modification of the antenna coupling means used in the system of Figure 1, and Figure 3 is a schematic diagram of another embodiment of the invention in a collision prevention system for mobile craft.

Refer to Figure 1. A beacon transmitter station 1, at a predetermined point on the ground, is provided with a radio transmitter 3 and an antenna 5. In the present illustration the antenna 5 is a dipole, mounted on a shaft 7 for rotation in a vertical plane, and connected to the transmitter 3 through slip rings 9. The antenna 5 is continuously rotated at a predetermined speed by a motor 11 coupled to the shaft 7. The transmitter 3 may be unmodulated or may be characteristically modulated or keyed for identification purposes.

A beacon receiver station 13 is provided on board an aircraft (not shown). The station 13 includes an antenna 15, similar to the antenna 5, mounted for rotation on a shaft 17 driven by a motor 21. The antenna 15 is connected through slip rings 19 to a radio receiver 23. A reflector 25 is provided adjacent the antenna 15 to make it directive, with its principal response forwardly along the longitudinal axis of the craft.

The output circuit of the receiver 23 is connected to a pair of band pass filter circuits 27 and 29. The filter 27 is designed to pass the frequency corresponding to the difference in the speeds of rotation of the antennas 5 and 15, and the filter 29 is designed to pass the frequency corresponding to the sum of said speeds of rotation. A pair of indicators, such as lamps 31 and 33, are connected to the outputs of the filters 27 and 29 respectively. A cathode ray oscilloscope 35 may also be provided with its vertical deflection input circuit connected to the output of the receiver 23.

The adjustment and operation of the system of Figure 1 is as follows:

Suppose the motor 11 is to be adjusted to rotate the antenna 5 clockwise, as viewed in the direction of the arrow A, at 900 revolutions per minute. The motor 21 rotates the antenna 15 clockwise, as viewed in the direction of the arrow C, at 3600 revolutions per minute. The filter 27 is tuned to pass 90 cycles per second, and the filter 29 passes 150 cycles per second.

Now if the receiver station 13 is approaching the ground station 1 in the direction of the arrow A, the antennas 5 and 15 are rotating in opposite directions. The total difference in their speeds is the sum of their individual speeds, or 4500 R. P. M. The two antennas are parallel to each other twice during each complete revolution relative to one another, or 9000 times per minute. Each time they are parallel, there is a maximum transmission between them; each time they are perpendicular, there is a minimum. Thus the signal applied to the receiver 23 is modulated in amplitude at $$\frac{9000}{60}$$

or 150 cycles per second. This modulation is detected in the receiver to provide a 150 cycle audio output. The receiver output is rejected by the filter 29, but passes through the filter 27, energizing the indicator 31.

The oscilloscope 35 shows the amplitude of the audio signal from the receiver 23. By steering the aircraft to maintain maximum output, the ground station may be approached on a direct path. As the aircraft approaches the ground station, the frequency of the audio output of the receiver 23 will remain 150 cycles per second; if the craft flies over the beacon, the signal from the antenna 5 will no longer be received, since the reflector 25 prevents the antenna from responding to signals arriving from behind. Thus neither indicator will operate when the craft is flying away from the ground station.

Suppose that the aircraft is approaching the beacon in the direction of the arrow B. Both antennas 5 and 15 are now rotating in the same direction, and their relative speed is 3600—900, or 2700 R. P. M. The input to the receiver 23 is modulated at 5400 cycles per minute, or 90 cycles per second, energizing the indicator 33. Thus the system of Figure 1 provides a clear and unambiguous indication of which of two opposite approach paths is being followed. It will be clear without further description that a plurality of beacon transmitters, pointed in different directions, could be provided at the ground station and distinguished from each other by keying, sequential operation in a predetermined cycle, or characteristic modulations.

In the system of Figure 1, slip rings are used to effect connection of the transmitter and receiver to their respective rotating antennas. Various other known systems, such as that described in copending U. S. patent application Serial No. 494,617, filed July 14, 1943 by Donald W. Peterson and entitled Radio frequency rotating joint, now Patent No. 2,465,922, may be used instead of slip rings. Referring to Figure 2, the dipole 5 is provided with a coupling coil 37, rotatable with the dipole on the shaft 7. A stationary coil 39 is provided closely adjacent the coil 37 and connected to the transmitter or receiver (not shown in Figure 2).

With antenna coupling means such as that of Figure 2 at both the beacon transmitter and the receiver, additional modulation will be superimposed on that caused by variation in relative positions of the antennas, owing to the variation in coupling between the coils 37 and 39 with rotation of the coil 37. Assuming the same rates of rotation as in the system of Figure 1, these additional modulation frequencies will be $$\frac{900 \times 2}{60} = 30 \text{ cycles per second}$$

and $$\frac{3600 \times 2}{60} = 120 \text{ cycles per second}$$

Since the filters 27 and 29 will both reject these additional modulations while passing those caused by relative antenna rotation, the system will operate substantially as described above with reference to Figure 1.

The present invention may be applied to a collision warning beacon system. Referring to Figure 3, both a beacon transmitter 1 and a beacon receiver 3 are carried aboard a mobile craft (not shown). The elements 1 and 3 are similar to the correspondingly numbered elements of the system of Figure 1, except that they are driven by a common motor 11, by mechanical coupling means schematically indicated by dash lines 41 and 43. The antennas may be driven at different speeds respectively by gearing included in the coupling means 41 and 43 and represented by blocks 41' and 43'. The antenna 5 radiates in all horizontal directions when in its vertical position, and in substantially all directions, except directly to the left and to the right of the longitudinal axis of the craft, when in its horizontal position. The antenna 15 receives mainly from the forward direction.

A craft carrying the equipment shown in Figure 3 is assumed to be headed toward another craft, similarly equipped. If the second craft is also headed toward the first, the signals transmitted by each will be picked up by the other. The antennas 5 and 15 on each craft will be facing those on the other craft, providing modulation at the higher frequency (e. g. 150 cycles) and thereby giving a warning on each craft that the other is approaching head-on.

If only one craft is headed toward the other, while the other is travelling in some other direction, only the first craft will receive a warning. For example, if one craft is overtaking the other, it will receive from the leading craft. Since both are facing in approximately the same direction, the signal will be modulated at the lower frequency (e. g. 90 cycles), informing the pilot of the overtaking craft of the condition. Similarly, if one craft is crossing in front of the other, the second will receive a warning, the signal in this case carrying additional modulation caused by rotation of the transmitting antenna in a plane perpendicular (or approximately so) to that of the receiving antenna. This additional modulation is filtered out, as described with reference to Figure 2, or may be utilized to actuate a further indicator through a band pass filter tuned to 30 cycles per second.

Although typical specific embodiments of the invention have been described it will be apparent to those skilled in the art that various modifications may be made therein. For example, a single indicator such as a frequency meter may be substituted for the band pass filters and separate indicators of Figure 1. Instead of using physically rotating antennas, the planes of polarization may be rotated by means of crossed dipoles energized through sine and cosine modulators, such as those shown in U. S. Patent 2,208,378.

Basically the instant invention contemplates indication of the direction of travel of a mobile station with respect to another station, which may be either mobile or fixed, by rotating continuously the planes of polarization in transmission at one station and in reception at the other at different rates. The input to the receiver is thereby modulated at one frequency when the approach is in one direction, and at a different frequency when in the opposite direction.

I claim as my invention:

1. A system for indicating the direction of approach or departure of one station to or from another comprising, at one of said stations, a radio transmitter, a dipole antenna coupled to said transmitter, and means for continuously rotating said dipole in a vertical plane; a radio receiver at the other of said stations, a dipole antenna coupled to said receiver, and means for continuously rotating said last mentioned dipole in a vertical plane; band pass filters connected to the output circuit of said receiver, and tuned respectively to frequencies corresponding to the sum and to the difference of the speeds of rotation of said dipoles, and distinguishable indicator means connected respectively to said filters.

2. A radio beacon system for mobile craft including a beacon transmitter, antenna means connected to said transmitter to radiate substantially plane polarized energy, and means for rotating the plane of polarization of said antenna means substantially continuously; a beacon receiver on a mobile craft, antenna means connected to said receiver and responsive substantially only to radiant energy polarized in a single plane, and means for rotating said last mentioned plane substantially continuously, whereby signals transmitted by said beacon transmitter and received by said beacon receiver are characteristically modulated at one frequency upon approach of said craft to said transmitter in one direction, and are modulated at another frequency upon approach of said craft to said transmitter in another direction.

3. A system for indicating the direction of approach or departure of one station to or from another comprising, at one of said stations, a radio transmitter, antenna means coupled to said transmitter to radiate substantially plane polarized energy, and means for continuously rotating the plane of polarization of said energy; a radio receiver at the other of said stations, antenna means coupled to said receiver and responsive substantially only to plane polarized radiant energy, and means for continuously rotating the plane of response of said antenna; band pass filters connected to the output circuit of said receiver and tuned respectively to frequencies corresponding to the sum and to the difference of the speeds of rotation of said planes, and indicator means connected to said filters.

4. A system for indicating the direction of approach or departure of one station to or from another comprising, at one of said stations, a radio transmitter, antenna means coupled to said transmitter to radiate substantially plane polarized energy, and means for continuously rotating the plane of polarization of said energy; a radio receiver at the other of said stations, antenna means coupled to said receiver and responsive substantially only to plane polarized radiant energy, and means for continuously rotating the plane of response of said antenna, whereby signals transmitted by said transmitter and received by said receiver are characteristically modulated in accordance with the relative motion of said stations.

EDWARD STANKO.

REFERENCES CITED

The following references are of record in the file of this patent:

UNITED STATES PATENTS

| Number | Name | Date |
|---|---|---|
| 1,823,794 | Esau | Sept. 15, 1931 |
| 1,828,705 | Kolster | Oct. 20, 1931 |
| 2,312,799 | Carter | Mar. 2, 1943 |

FOREIGN PATENTS

| Number | Country | Date |
|---|---|---|
| 545,880 | Great Britain | June 17, 1942 |